(12) United States Patent
Yamasaki

(10) Patent No.: US 8,442,757 B2
(45) Date of Patent: May 14, 2013

(54) NAVIGATION DEVICE

(75) Inventor: Akira Yamasaki, Tottori (JP)

(73) Assignees: SANYO Electric Co., Ltd., Moriguchi-shi, Osaka (JP); Sanyo Consumer Electronics Co., Ltd., Tottori-shi, Tottori (JP)

( * ) Notice: Subject to any disclaimer, the term of this patent is extended or adjusted under 35 U.S.C. 154(b) by 329 days.

(21) Appl. No.: 12/937,619

(22) PCT Filed: Apr. 16, 2009

(86) PCT No.: PCT/JP2009/057643
§ 371 (c)(1),
(2), (4) Date: Oct. 13, 2010

(87) PCT Pub. No.: WO2009/128496
PCT Pub. Date: Oct. 22, 2009

(65) Prior Publication Data
US 2011/0035145 A1    Feb. 10, 2011

(30) Foreign Application Priority Data
Apr. 17, 2008  (JP) ................... 2008-107578

(51) Int. Cl.
*G09B 29/00* (2006.01)
*G01G 1/0969* (2006.01)
*G06F 19/00* (2006.01)

(52) U.S. Cl.
USPC ............ 701/409; 701/461; 345/156; 715/810

(58) Field of Classification Search ............. 701/409, 701/421, 446, 461; 345/156, 690, 619, 173; 340/995.16, 995.23; 715/810, 780, 840, 715/781; 348/14.01
See application file for complete search history.

(56) References Cited

U.S. PATENT DOCUMENTS 5,646,856 A * 7/1997 Kaesser ................. 701/532
5,731,979 A * 3/1998 Yano et al. ............. 701/455
(Continued)

FOREIGN PATENT DOCUMENTS

JP    6-066584 A    3/1994
JP    7-141597 A    6/1995
(Continued)

OTHER PUBLICATIONS

International Search Report of PCT/JP2009/057643, mailing date Jul. 21, 2009.

*Primary Examiner* — Tan Q Nguyen
(74) *Attorney, Agent, or Firm* — Westerman, Hattori, Daniels & Adrian, LLP

(57) ABSTRACT

When setting a spot by designating a desired position on a map displayed on a display unit, a spot setting menu picture is displayed in the vicinity of the designated position, thereby improving the visibility of a positional relation to improve operability. A navigation device (1) is provided with an input unit (13) which designates a spot on the displayed map, a spot position detection unit (16) which identifies the spot designated by the input unit (13), a menu display position determination unit (17) which determines the display position of the menu picture (38) for selecting an item for setting the spot identified by the spot position detection unit (16), and a mark display unit (18) which displays a spot setting mark (36) which indicates a touch-operated position on a display screen. The menu display position determination unit (17) detects the display position of the spot setting mark (36) and determines the display position of the menu picture (38) in accordance with the display position of the spot setting mark (36).

7 Claims, 14 Drawing Sheets

U.S. PATENT DOCUMENTS

| | | | |
|---|---|---|---|
| 6,040,824 A | 3/2000 | Maekawa et al. | |
| 6,122,592 A * | 9/2000 | Arakawa et al. | 701/426 |
| 6,266,611 B1 * | 7/2001 | Matsubayashi | 701/533 |
| 7,472,019 B2 * | 12/2008 | Hara | 701/426 |
| 7,620,495 B2 * | 11/2009 | Minagawa et al. | 701/423 |
| 7,788,028 B2 * | 8/2010 | Matsuoka et al. | 701/425 |
| 2002/0177944 A1 | 11/2002 | Ihara et al. | |
| 2006/0047422 A1 * | 3/2006 | Fukumi | 701/209 |
| 2007/0226646 A1 * | 9/2007 | Nagiyama et al. | 715/784 |
| 2008/0228389 A1 * | 9/2008 | Kano et al. | 701/204 |
| 2011/0077851 A1 * | 3/2011 | Ogawa et al. | 701/200 |

FOREIGN PATENT DOCUMENTS

| | | |
|---|---|---|
| JP | 10-197263 A | 7/1998 |
| JP | 2000-268548 A | 9/2000 |
| JP | 2002-328028 A | 11/2002 |
| JP | 2003-157135 A | 5/2003 |
| JP | 2004-239658 A | 8/2004 |

* cited by examiner

FIG.2

| ROAD NAME · ROAD ID | | | | | |
|---|---|---|---|---|---|
| LINK ID | START POINT NODE | END POINT NODE | ATTRIBUTE INFORMATION | | |
| | | | ROAD TYPE | WIDTH | |
| | | | | | |
| | | | | | |
| | | | | | |
| | | | | | |

| DISPLAY POSITION OF LOCATION SETTING MARK | DIRECTION OF DISPLAY POSITION OF MENU |
|---|---|
| FIRST QUADRANT | SECOND, THIRD QUADRANT |
| SECOND QUADRANT | FIRST, FOURTH QUADRANT |
| THIRD QUADRANT | FIRST, FOURTH QUADRANT |
| FOURTH QUADRANT | SECOND, THIRD QUADRANT |

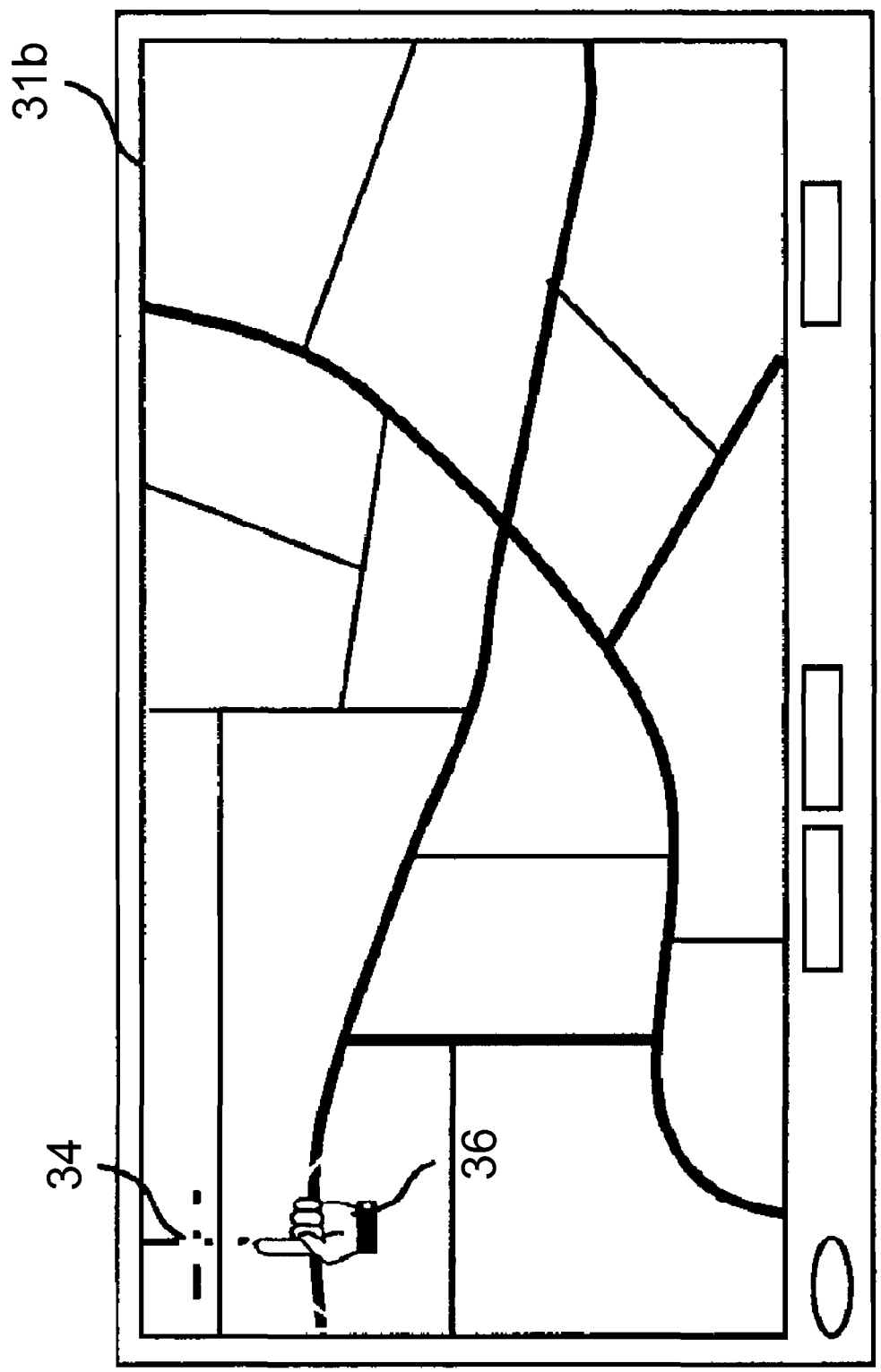

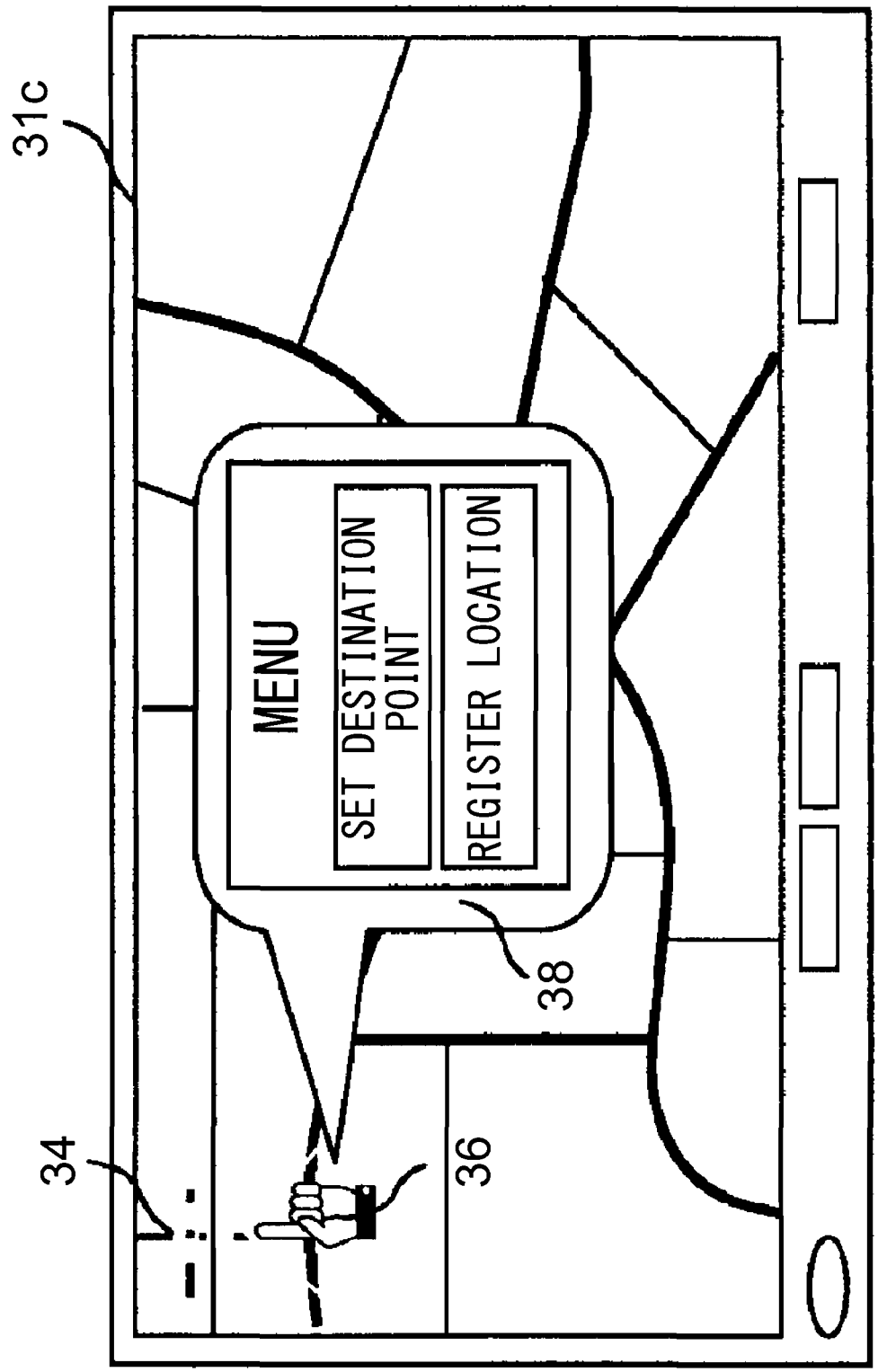

NAVIGATION DEVICE

TECHNICAL FIELD

The present invention relates to a navigation device that provides route guidance by searching for a route from a desired departure point up to a destination point and displaying the guiding route and a current position on a map displayed on a display portion. The present invention relates particularly to a navigation device in which, in designating a location on a displayed map and setting the location to be a destination point or an intermediate point, a location setting mark and a location setting menu image are displayed on the map.

BACKGROUND ART

Conventionally, there has been known an on-vehicle navigation device that, when a user drives an automobile or the like on a road, provides guidance by recognizing a current position along the way to a destination point and displaying the current position together with a road map on a display screen so that the user can reach the destination point without getting lost. Furthermore, a pedestrian navigation system utilizing a portable terminal device such as a mobile telephone also has been provided. This navigation system is a communication-type navigation system composed of a portable terminal device and a route search server.

In a field of on-vehicle navigation devices, there has been provided a navigation device in which a display portion is provided with a touch panel for allowing various operations to be performed so that the navigation device can be operated without interfering with a driving operation. In such a navigation device, processing of selecting or switching a function is performed through a selection of a desired menu item on a menu screen displayed on the display portion, and a desired location is designated on a map image displayed on the display portion, thus allowing a destination point or an intermediate point to be set.

For example, Patent Document 1 discloses a vehicular route guidance device in which a desired location is designated with a touch on a map image displayed on a display portion and thus a destination point or an intermediate point is set. This vehicular route guidance device has a configuration in which an operation key "REGISTER" and an operation key "DESTINATION PONT" are displayed on a map display screen for displaying a map searched for by place names, and when the "REGISTER" key is touched, a location can be registered on a map being displayed at the time the "REGISTER" key is touched, while when the "DESTINATION POINT" key is touched, a destination point can be set on a map being displayed at the time the "DESTINATION POINT" key is touched.

Similarly, Patent Document 2 discloses a navigation device having a touch panel. This navigation device employs an information display system having the touch panel for allowing a predetermined item from among a plurality of displayed menu items to be selected by touching, and the information display system includes a select unit that selects the selected item based on coordinates of the plurality of menu items displayed on a display screen and coordinates of a touched position, and a control unit that displays the selected item selected by the select unit at the center of the display screen.

Moreover, Patent Document 3 discloses a navigation device in which the creation of marks can be performed by an intuitive operation. This navigation device displays together with a map on a display portion, control buttons associated with specific types of processing, respectively, such as a mark setting button, a destination point setting button, an intermediate point setting button, and an erase button. When a specific mark setting button and arbitrary coordinates on a map are designated through a drag operation on a touch panel, a mark creation processing unit creates a mark object and displays it at a position on the map, which corresponds to the designated coordinates, thereby allowing a desired location to be set.

PRIOR ART DOCUMENT

Patent Document

Patent Document 1: JP-A-H 6-66584
Patent Document 2: JP-A-2003-157135
Patent Document 3: JP-A-2002-328028

DISCLOSURE OF THE INVENTION

Problems to be Solved by the Invention

In general, in setting a desired location to be a destination point or the like by use of a map image displayed on a display unit, first, the map image is scrolled or a landmark location that can be used to locate the area surrounding the desired location is searched for and displayed on the map image so that the vicinities of the desired location are displayed on the map, after which the desired location is visually recognized and identified and then it is designated on a touch panel.

Location setting relates to several types of processing as represented by items for, for example, setting a departure point, setting a destination point, setting an intermediate point, and registering a location. Conventionally, as in the techniques disclosed in Patent Documents 1 to 3 mentioned above, processing of location setting is performed in such a manner that menu item buttons for making a selection from among the above-described items are displayed and one of those items is selected, after which a desired location is designated on a map image by use of a touch panel; or these are performed in reverse order, i.e. a desired location is designated, after which an operation with respect to the menu item buttons is performed.

In cases where the techniques disclosed in Patent Documents 1 to 3 are applied, however, menu item buttons are displayed at a specific fixed position on a screen regardless of the position of a location to be designated. This has led to a problem that, on a map image, menu item buttons are displayed at a position away from the position of a location to be designated, so that visibility in terms of a positional relationship between the location to be designated and the menu item buttons is deteriorated, thus impairing operability.

In order to solve the above-described problem, it is an object of the present invention to provide a navigation device in which, in designating a desired location on a map displayed on a display unit and thus performing location setting, a location setting menu image is displayed in the vicinity of the location thus designated, thereby improving visibility in terms of a positional relationship between the designated location and the menu image, and thus enhancing operability.

Means for Solving the Problem

In order to achieve the above-described object, an invention according to claim 1 of the present application is a navigation device including: an input unit which designates a location on a map displayed on a display unit; a location position detection unit which identifies the location designated by the input unit; a menu display position determination unit which determines a display position of a menu image used to select an item for setting the location identified by the location position detection unit; and a mark display unit which displays a location setting mark pointing at the designated location. In the navigation device, the menu display position determination unit detects a display position of the location setting mark and determines the display position of the menu image in accordance with the display position of the location setting mark.

According to the above-described configuration as a first configuration, the location setting menu image is displayed in consideration of a display position of a location desired to be set, thereby improving visibility and thus enhancing operability.

Furthermore, in the present invention, in the above-described navigation device of the first configuration, the menu image is displayed in a pop-up dialogue box emerging from the location setting mark.

According to the above-described configuration as a second configuration, the positional relationship between the location setting mark and the location setting menu image is highlighted by being displayed in a pop-up manner, thereby improving visibility and thus enhancing operability.

Furthermore, in the present invention, in the above-described navigation device of the first or second configuration, a display screen of the display unit has a display region segmented into a predetermined number of regions. The menu display position determination unit detects one of the regions, in which the location setting mark is displayed, and determines to dispose the menu image in proximity to the location setting mark, on the side of another of the regions, which is opposed to and is in a vertical or horizontal direction with respect to the detected one of the regions.

According to the above-described configuration as a third configuration, regardless of which portion of the display region of the display screen includes a position desired to be set, the location setting mark is displayed at the position desired to be set, and the location setting mark and the location setting menu image are displayed in proximity to each other, thereby improving visibility and thus enhancing operability.

Furthermore, in the present invention, in the above-described navigation device of the first or second configuration, the menu display position determination unit detects the display position of the location setting mark, and dividing a display screen by a plurality of straight lines intersecting at the detected display position of the location setting mark, the menu display position determination unit determines the display position of the menu image in consideration of the areas of individual regions obtained by dividing the display screen.

According to the above-described configuration as a fourth configuration, the display screen is divided, around a display position of the location setting mark as a center, into a plurality of radially arranged regions, and the menu image is displayed in consideration of the areas of individual regions obtained by the division, thereby improving visibility in terms of a positional relationship between the location setting mark and the menu image and thus enhancing operability.

Furthermore, in the present invention, in the above-described navigation device of the fourth configuration, the menu display position determination unit determines a region having the largest area, among the individual regions obtained by dividing the display screen, as a region including the display position of the menu image.

According to the above-described configuration as a fifth configuration, the menu image is displayed in a region having the largest area among the radially arranged regions obtained by division around the location setting mark as a center, and thus the display screen provides homogeneous and well-balanced display conveying no sense of congestion, thereby improving visibility and thus enhancing operability.

Advantages of the Invention

According to the present invention, a location setting menu image is displayed in consideration of a display position of a location desired to be set, and thus visibility in terms of a positional relationship between a location setting mark and the menu image is improved, thereby making it possible to provide excellent usability and enhance operability in performing location setting.

BRIEF DESCRIPTION OF DRAWINGS

FIG. 2 A diagram to show an example of a data configuration of road data included in map data.

FIG. 5B A diagram to show the relationship between the display position of the location setting mark and the display position of the location setting menu image.

FIG. 5C A diagram to show the relationship between the display position of the location setting mark and the display position of the location setting menu image.

BEST MODE FOR CARRYING OUT THE INVENTION

Hereinafter, an embodiment of the present invention will be described in detail with reference to the appended drawings.

It should be understood, however, that the following embodiment is only illustrative of a navigation device for embodying the technical idea of the present invention and is not intended to limit the present invention to the navigation device according to this embodiment, and the present invention is also applicable equally to navigation devices according to other embodiments that fall within the scope of the appended claims.

The following embodiment describes a case where a display screen is divided vertically into two regions and horizontally into two regions, i.e. into four regions in total. The number of regions obtained by dividing a screen, however, is not limited to four and may be arbitrary as long as the screen is divided vertically into three or more regions and horizontally into three or more regions depending on the aspect ratio and size of the screen. As one possible example, a screen may be divided vertically into three regions and horizontally into six regions, i.e. into 18 regions. In this case, since high-definition broadcasts are in a vertical to horizontal aspect ratio of 9:16, for example, in a display unit also capable of receiving high-definition television broadcasts, a screen is divided into an increased number of regions of a shape approximating to a square, and thus detailed display requirements can be met and homogeneity is imparted, thereby further improving visibility.

Embodiment

Figure 1:
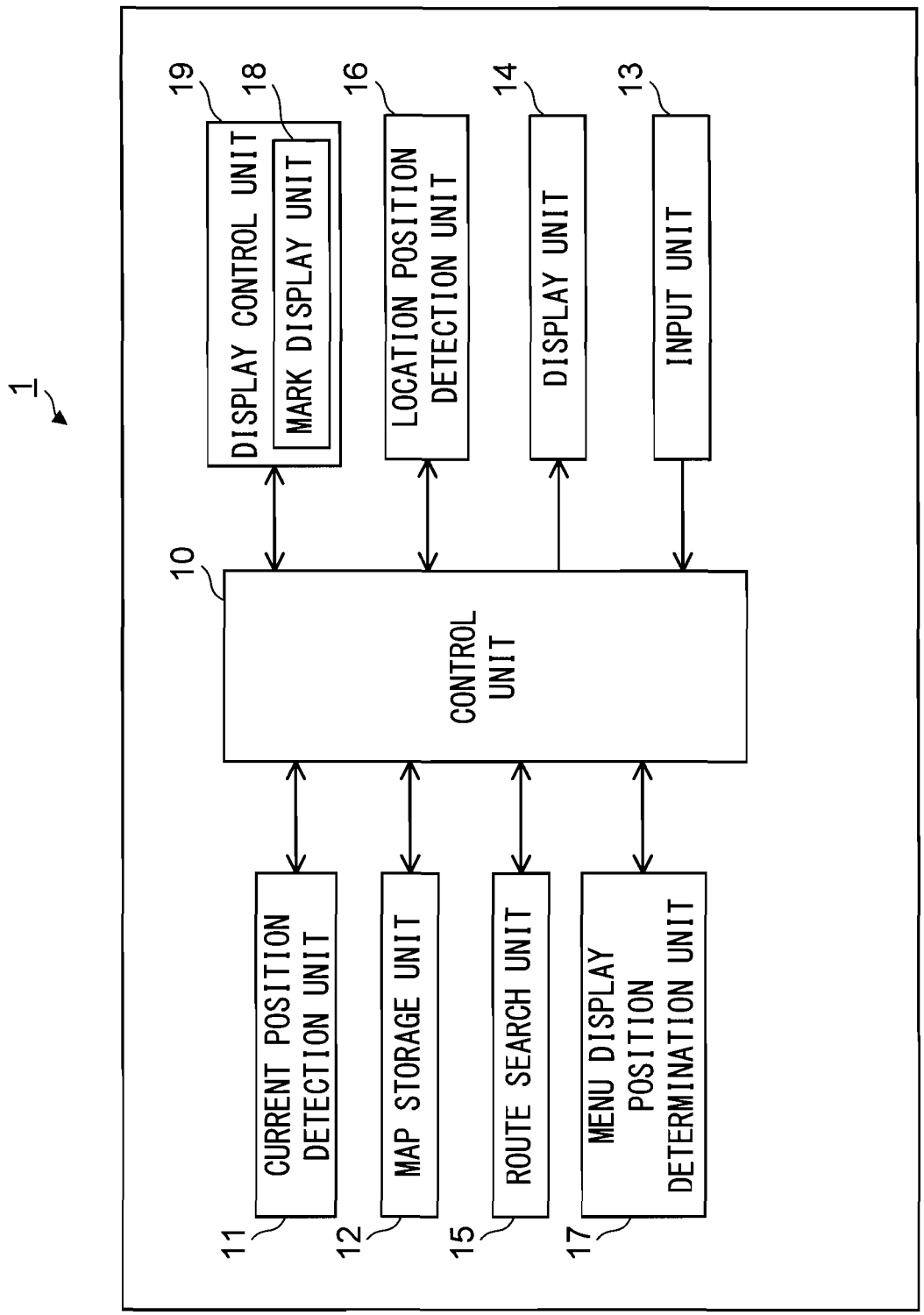
FIG. 1 A block diagram to show the configuration of a navigation device according to an embodiment of the present invention.

FIG. 1 is a block diagram to show the configuration of an on-vehicle navigation device according to an embodiment of the present invention. A navigation device 1 may be of a type that is mounted on a dashboard of a vehicle such as an automobile and used in that state as an on-vehicle type navigation device, or may be of a type that is detachable from a vehicle so as to be used while being carried by a user. In the following description, these types are referred to collectively as the navigation device 1.

The navigation device 1 includes a control unit 10, a current position detection unit 11, a map storage unit 12, an input unit 13, a display unit 14, a route search unit 15, a location position detection unit 16, a menu display position determination unit 17, a display control unit 19 including a mark display unit 18, and the like.

The control unit 10 is formed of a processor composed of a CPU, a RAM, a ROM, etc. and controls operations of the individual constituent parts of the navigation device 1 in accordance with control programs recorded in the RAM and the ROM.

The current position detection unit 11 is formed of, for example, a GPS receiver. Receiving radio waves containing time information from a plurality of GPS satellites orbiting over the earth, the current position detection unit 11 recognizes a current position based on the radio waves and generates current position information.

As the current position detection unit 11, a self-contained navigation unit composed of a rudder angle sensor, an acceleration sensor, a distance sensor, a direction sensor, and the like may be used in a shared manner. In this case, a travel distance and a travel direction of a vehicle are detected, respectively, and summation of each of their values with respect to a reference position is performed thereby to calculate a current position. When combined with a method based on GPS reception, this method for detecting a current position by use of a self-contained navigation unit can be used effectively in tunnels where the reception of GPS radio waves is hindered or in districts of high-rise buildings where reception errors are likely to occur due to scattering of radio waves.

The map storage unit 12 stores road data including road node data and road link data, where junction points such as intersections and branch points of individual roads are defined as nodes and routes, each connecting one node to another, are defined as links. Road node data includes road node numbers, position coordinates, the numbers of connected links, names of intersections, and the like. Road link data includes road node numbers of nodes as starting points and end points, road types, link lengths (link costs), required lengths of time, the numbers of lanes, roadway widths, and the like. As link attributes, data on bridges, tunnels, railroad crossings, tollbooths, and the like further is imparted to road link data. Road types refer to information as to, for example, whether each road is a freeway or a tollway and whether each road is a national road or a prefectural road.

Road data on freeways include positional information of specific areas such as parking areas and service areas built along the individual freeways and information on an entry road to each of the specific areas and an exit road therefrom. Furthermore, road data is provided with attribute information such as road types including a freeway, a national road, a prefectural road, a municipal road, etc., road widths, and the numbers of lanes and is stored as map data for each of upbound and downbound traveling directions.

Using a communication unit, which is not shown, a connection is established to a server via the Internet so that map data stored in the map storage unit 12 can be updated with the newest map data downloaded from the server.

FIG. 2 is a diagram to show an example of a data configuration of road data included in map data. As shown in FIG. 2, as road data, link IDs of individual road links, start point nodes, end point nodes, and attribute information of each road are stored for each of roads (road names and road IDs). Attribute information includes information such as road types including a freeway, a national road, a municipal road, etc., and road widths.

The input unit 13 is formed of various types of keys and switches, etc. and is a unit where an input operation with respect to the navigation device 1 is performed. It also is possible that the display unit 14, which will be described later, is provided with a touch panel as the input unit 13, and an input operation is performed using this touch panel.

During the time that route guidance is provided, the display unit 14 displays a map image and a guiding route on the map image so that the guiding route can be distinguished from other roads, and is formed of, for example, a liquid crystal display.

In this embodiment, an input operation is performed using a touch panel.

When a user designates a departure point and a destination point by means of the input unit 13, the route search unit 15 searches, by referring to road data stored in the map storage unit 12, for an optimum route from the departure point up to the destination point and generates guiding route data. In this search for an optimum route, links and nodes included in routes extending from a road node corresponding to a current position or the departure point designated by the user to a road node corresponding to the destination point designated by the user are searched for using various methods such as a Dijkstra's algorithm, and based on the links and nodes, a link length (link cost), a required length of time, or the like is accumulated. Then, for example, a route achieving a minimum total link length or a minimum total required length of time is taken as a guiding route and rode nodes and links included in the route are provided as guiding route data.

The route obtained as a result of the search is displayed together with a map image on the display unit 14. A current position mark indicating a current position of the vehicle also is displayed so as to be superimposed on the map image. The map image is scrolled as the vehicle travels and displayed, for example, in such a manner that a current position coincides with the center of a display screen.

Due to errors included in positional information detected by the current position detection unit 11, the calculation of a current position might give a position deviating from a road as the current position. In such a case, a matching processing unit, which is not shown, performs map matching for correcting the current position to be on the road.

When the user designates a desired location on a map image displayed on the display unit 14 through an operation on the touch panel, the location position detection unit 16 compares the user-designated location on the touch panel with road data thereby to identify the designated location.

In designating a desired position (location) on a map image displayed on the display unit 14 and thus setting a destination point or an intermediate point, a location input mode is selected by use of the input unit 13, and a map image including the location desired to be set is displayed. A map image including a desired location can be displayed, for example, in the following manner. That is, a map is scrolled using a scroll cursor, or a facility that can be used as a landmark in the vicinity of the desired location is searched for, thereby allowing the map image including the desired location to be displayed.

Figure 3A:
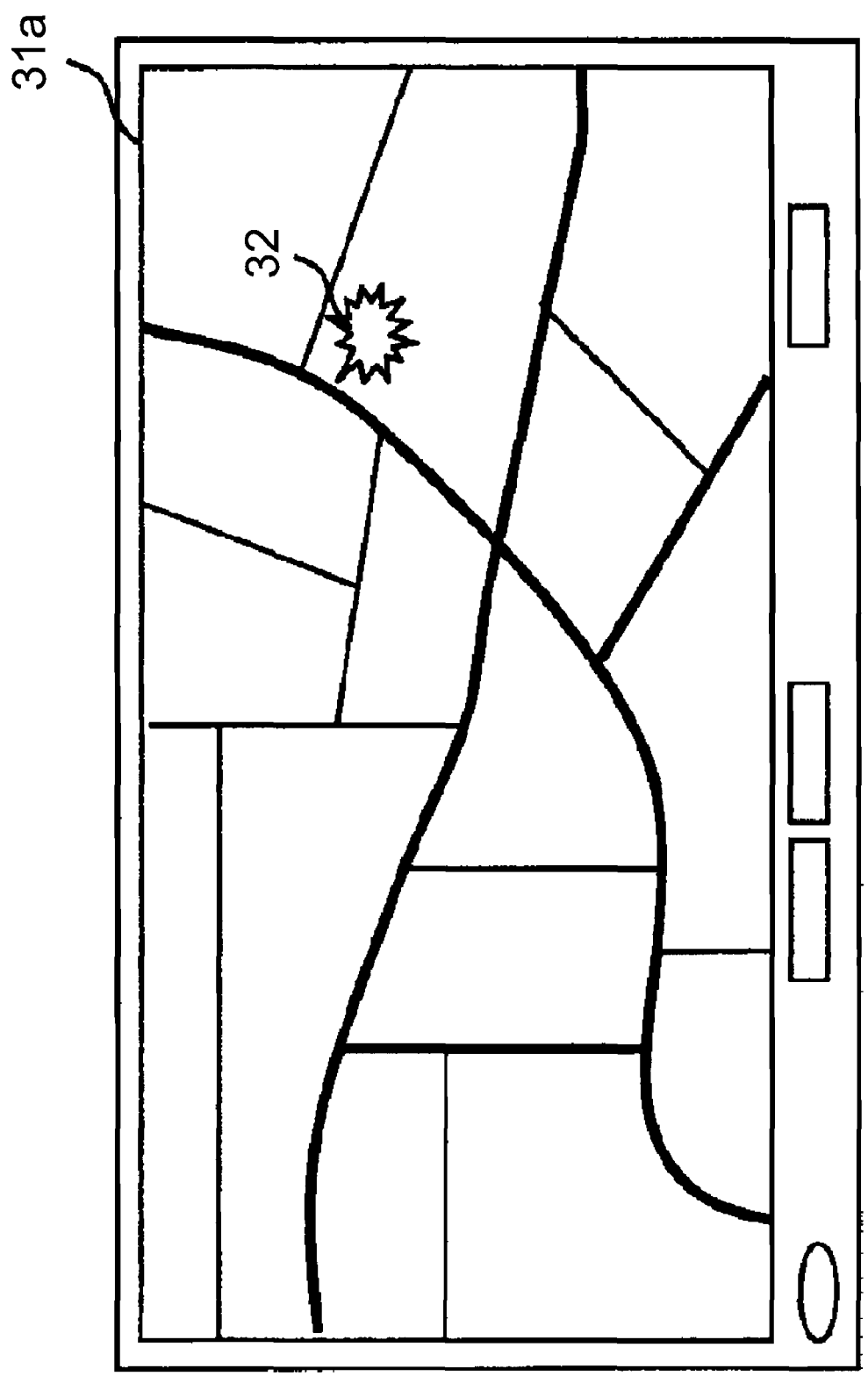
FIG. 3A A diagram to illustrate a concept of processing according to the present invention, in which a desired location is set through an operation on a touch panel.
Figure 3B:
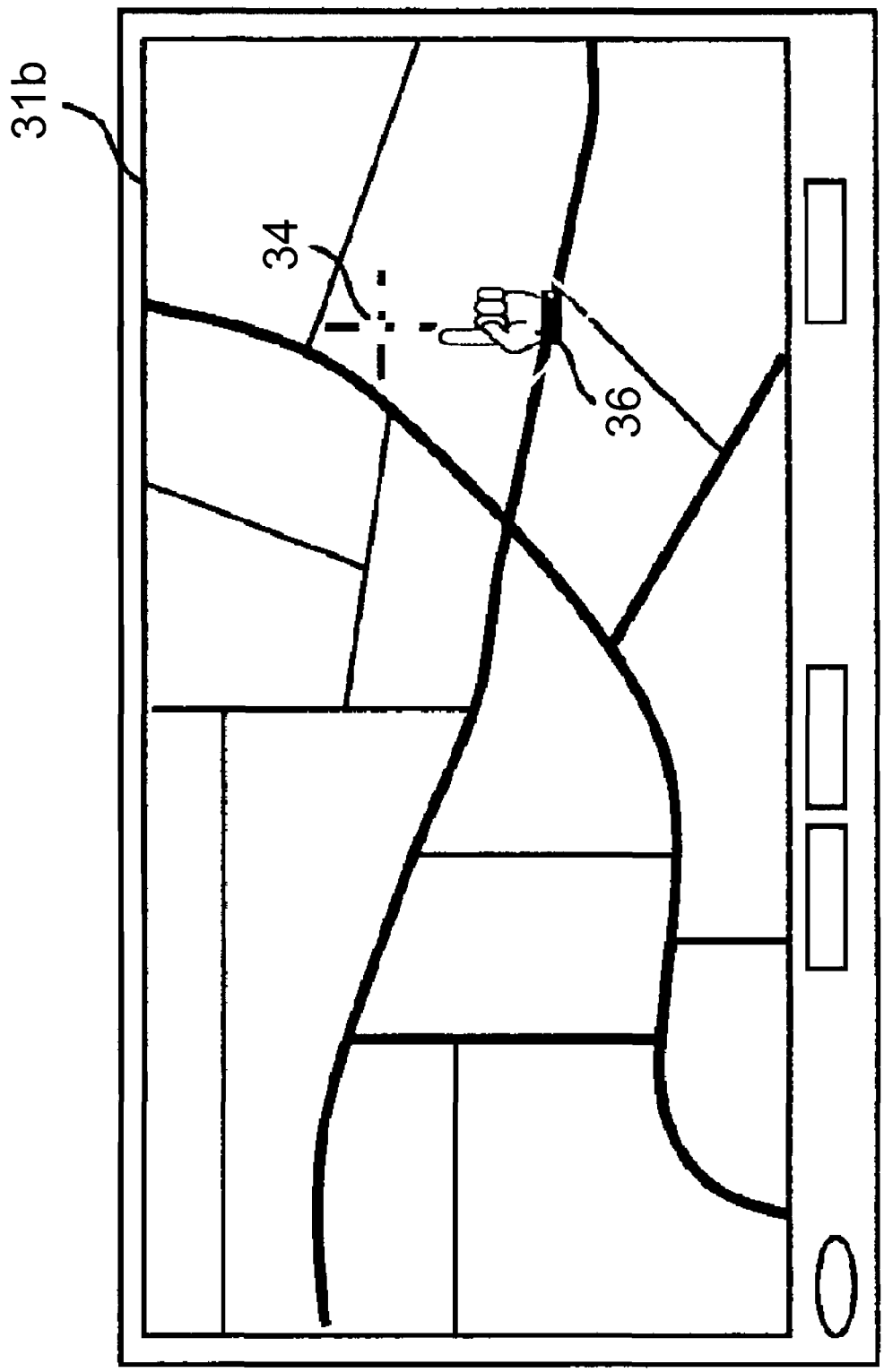
FIG. 3B A diagram to illustrate the concept of the processing according to the present invention, in which a desired location is set through the operation on the touch panel.
Figure 3C:
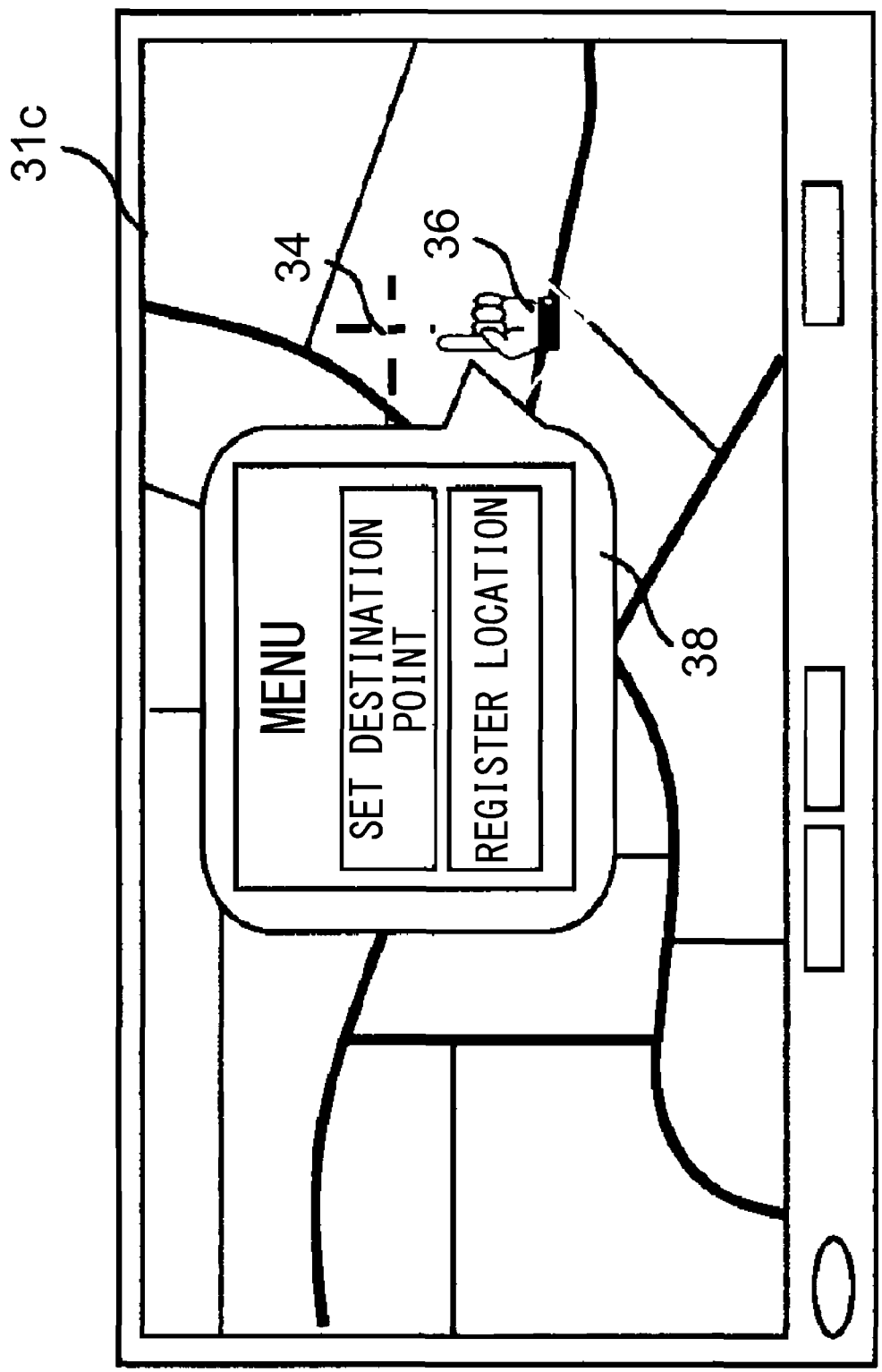
FIG. 3C A diagram to illustrate the concept of the processing according to the present invention, in which a desired location is set through the operation on the touch panel.

FIGS. 3A, 3B, and 3C are screen transition diagrams to illustrate the concept of this procedure.

When, as shown in FIG. 3A, a map image including a location 32 is displayed by scrolling and the location 32 is designated as a desired location, the screen makes a transition from a display image 31a shown in FIG. 3A to a display image 31b shown in FIG. 3B, in which a cursor 34 is displayed at the position of the desired location 32 and a location setting mark 36 is displayed in the vicinity of the cursor 34. If, in this state, a location setting operation is executed by touching the location setting mark 36, the display screen makes a transition to a display image 31c shown in FIG. 3C, in which a location setting menu image 38 is displayed in the vicinity of the location setting mark 36. In this embodiment, the location setting menu image 38 is displayed in a pop-up dialogue box emerging from the location setting mark 36. If, for example, one of menu items described in this embodiment, which are an item for setting a destination point and an item for registering a location, is selected in the menu image 38, the position that has been pointed at by the location setting mark 36 is set as a location set by an operation of the selected item.

A position pointed at by the location setting mark 36 corresponds to a display position of the cursor 34. In a stage when a map image has been scrolled only roughly, the location setting mark 36 may not necessarily be pointing at an exact position desired to be set. In such a case, on a map displayed, for example, in an enlarged manner, the user moves the cursor 34 or the location setting mark 36 to the exact desired position on a map image being displayed.

Thus, the position reached by the above movement is now a position supposed to be set. At this time, if the user executes a location setting operation by touching the location setting mark 36, the location setting menu image 38 is displayed in the vicinity of the location setting mark 36 displayed at the position reached by the above movement, and if one of the menu items such as the item for setting a destination point and the item for registering a location is selected, the position that has been pointed at by the location setting mark 36 is set as a location set by an operation of the selected item.

As described above, the location setting mark 36 is displayed at a position desired to be set, and at the same time, the location setting menu image 38 is displayed in a pop-up dialogue box emerging from the location setting mark 36, and thus visibility in terms of a positional relationship is improved, thereby providing excellent usability and enhancing operability in performing location setting.

Meanwhile, since the location setting mark 36 is displayed not at a fixed position such as the center of a displayed map image but in the vicinity of a position desired by the user to be set, a portion of a display region of the display screen, which is optimum for displaying the location setting menu image 38 in a pop-up manner, varies depending on a display position of a location desired to be set on the screen. Thus, in the present invention, a display position of the menu image 38 is controlled in accordance with a display position of the location setting mark 36.

FIG. 4 illustrates the concept of the display position control described above.

Figures 4A, 4B:
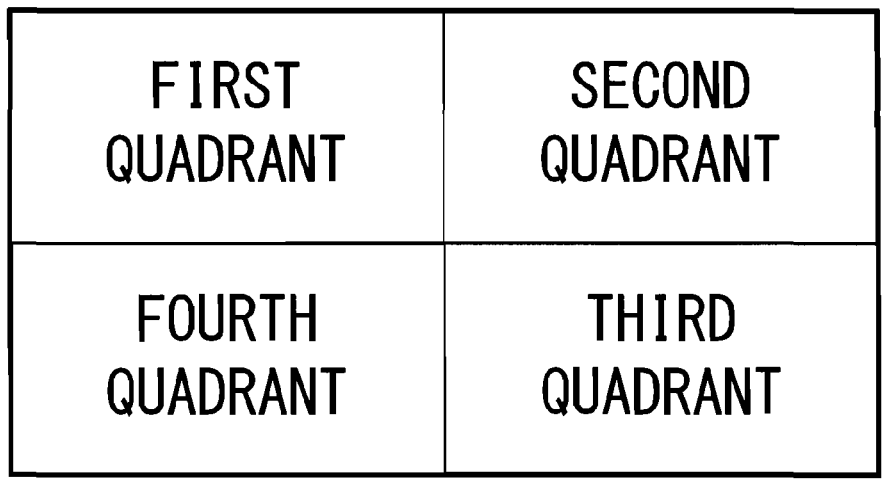
FIG. 4A A conceptual diagram to illustrate a concept of processing of determining a display position of a location setting menu image, by showing a display region of a display screen segmented into four regions.
FIG. 4B A diagram to illustrate the concept of the processing of determining a display position of the location setting menu image, by showing a data table used for determining a direction of the display position of the menu image.

As shown in FIG. 4A, the display screen is segmented, by two straight lines intersecting orthogonally at the center of the screen, into four regions, clockwise from top left: a first quadrant, a second quadrant, a third quadrant, and a fourth quadrant. The location position detection unit 16 detects which quadrant of the display screen includes a position pointed at by the location setting mark 36, i.e. a position at which the cursor 34 is displayed.

The location position detection unit 16 compares, with road data, a location on the touch panel, which is designated by the user by designating a desired location on a map image displayed on the display unit 14 through an operation on the touch panel, thereby to identify the location. The location position detection unit 16 then judges that the location thus identified corresponds to the position pointed at by the location setting mark 36, i.e. to the position at which the cursor 34 is displayed.

The menu display position determination unit 17 determines, in accordance with the quadrant in which the location setting mark 36 is displayed, a display position for displaying the location setting menu image 38 in a pop-up manner relative to the location setting mark. For example, in the example shown in FIG. 3C, since the location setting mark 36 is displayed in the second quadrant, the menu image 38 is displayed in a pop-up manner so as to be disposed in the direction of the first quadrant or the fourth quadrant relative to the location setting mark. In this case, what is important is a direction in which the menu image is disposed relative to the location setting mark, and the position itself of the menu image, in whichever quadrant the menu image is disposed, does not particularly matter.

This determination of a disposition direction is made based on a data table shown in FIG. 4B. As shown in FIG. 4B, if a display position of the location setting mark 36 is in the first quadrant, a display position of the menu image 38 is set to be in the right side and lower side directions, i.e. in the directions of the second quadrant and the third quadrant. If a display position of the location setting mark 36 is in the second quadrant, a display position of the menu image 38 is set to be in the lower side and left side directions, i.e. in the directions of the first quadrant and the fourth quadrant. In the following description, this determination is made in accordance with FIG. 4B.

Figure 5A:
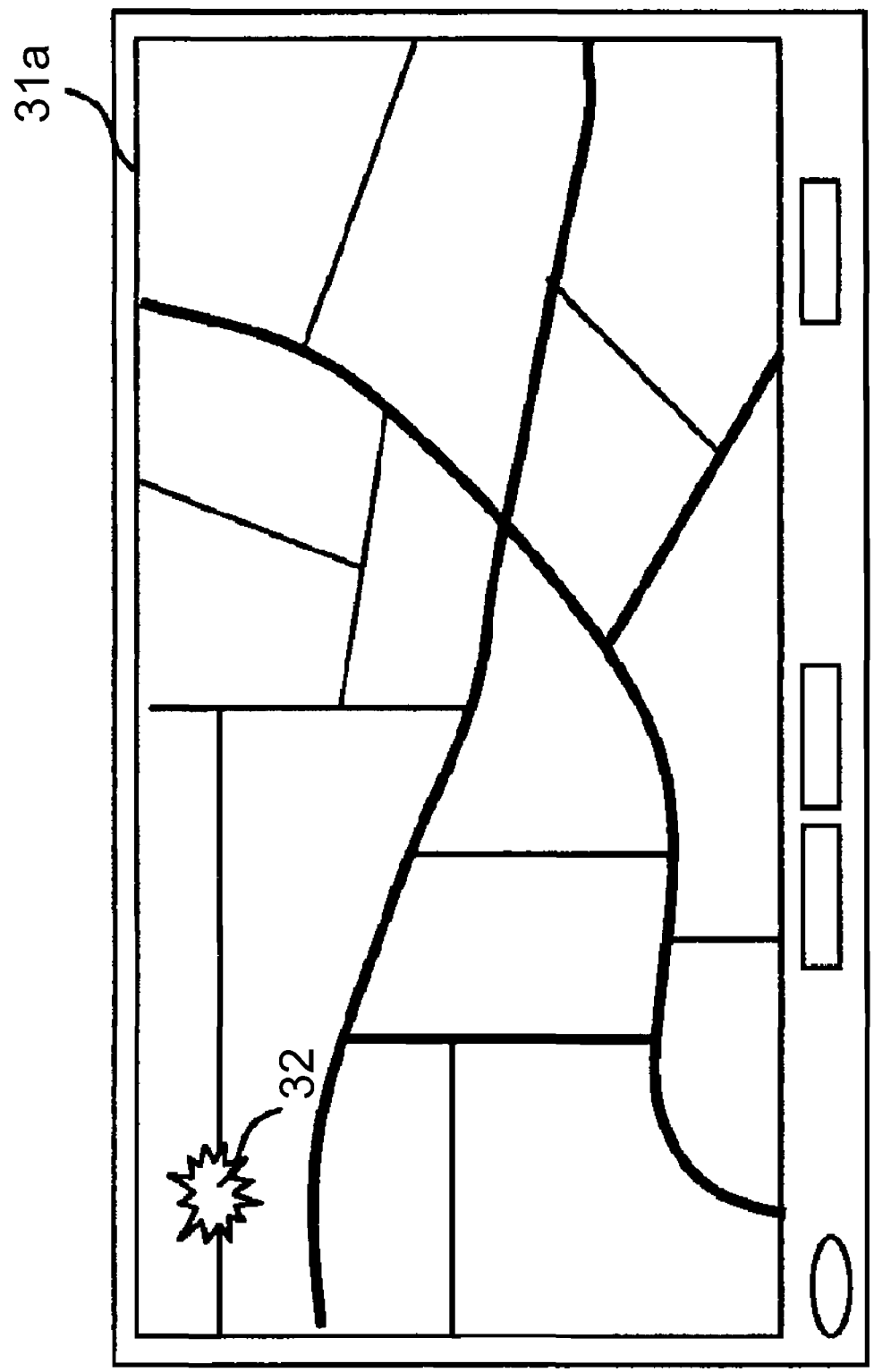
FIG. 5A A diagram to show a relationship between a display position of a location setting mark and a display position of a location setting menu image.

In the example shown in FIGS. 5A to 5C, since the location setting mark 36 is displayed in the first quadrant, the menu image 38 is displayed in a pop-up manner in the direction of the second quadrant and the third quadrant.

Figure 6A:
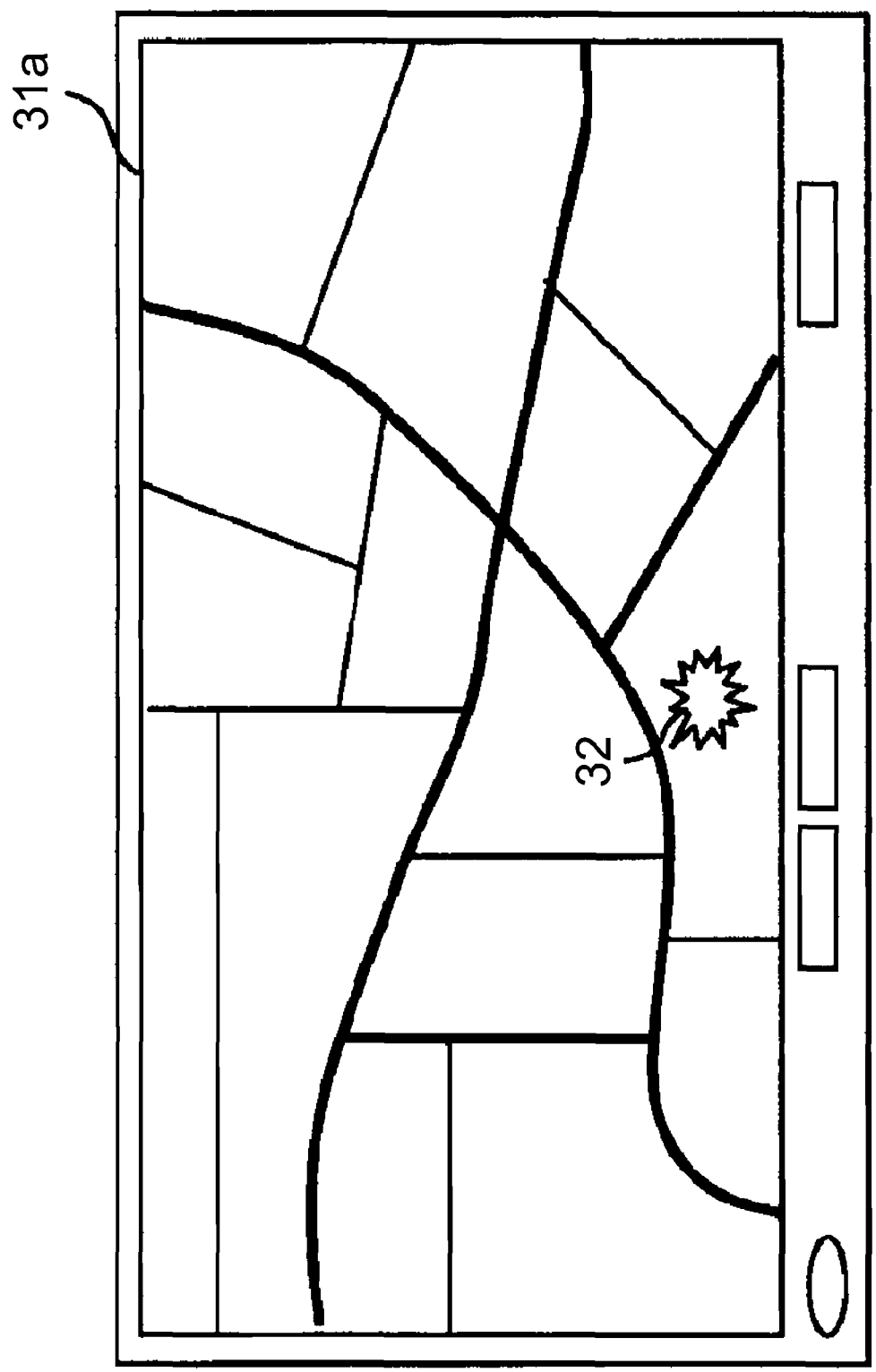
FIG. 6A A diagram to show a relationship between a display position, as another example, of a location setting mark and a display position of a location setting menu image.
Figure 6B:
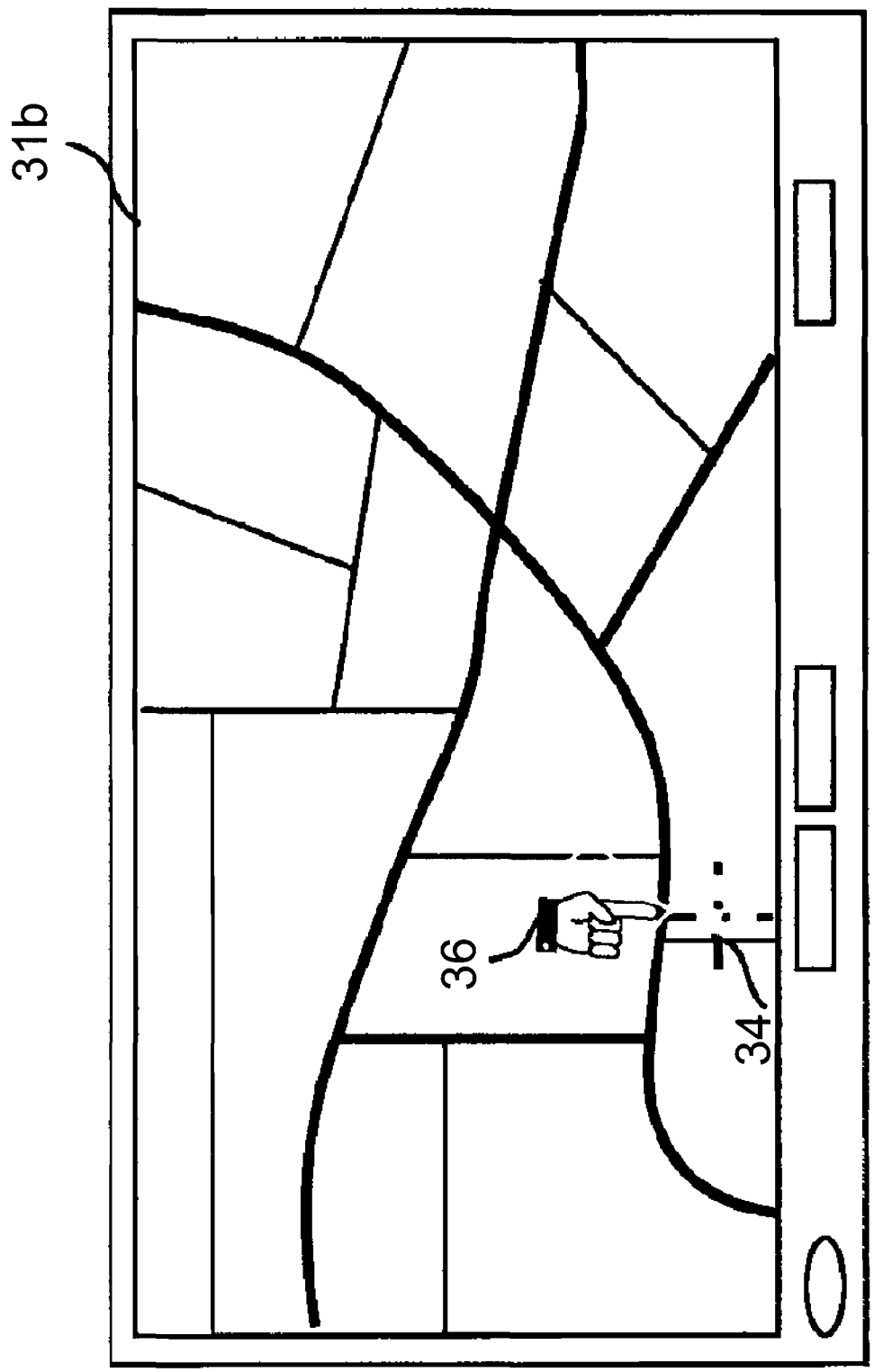
FIG. 6B A diagram to show the relationship between the display position, as another example, of the location setting mark and the display position of the location setting menu image.
Figure 6C:
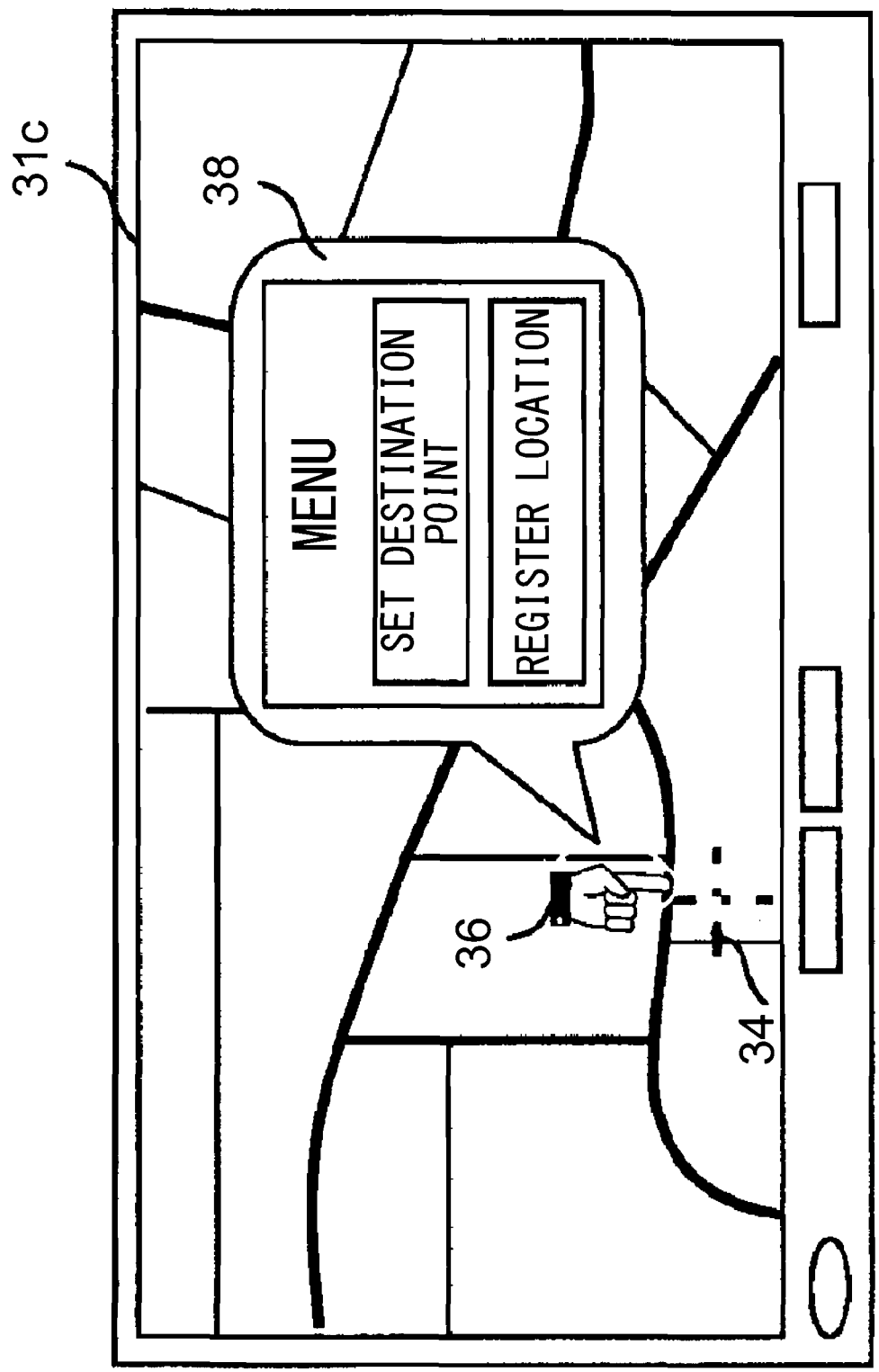
FIG. 6C A diagram to show the relationship between the display position, as another example, of the location setting mark and the display position of the location setting menu image.

In the example shown in FIGS. 6A to 6C, since the location setting mark 36 is displayed in the fourth quadrant, the menu image 38 is displayed in a pop-up manner in the direction of the second quadrant and the third quadrant.

Figure 7:
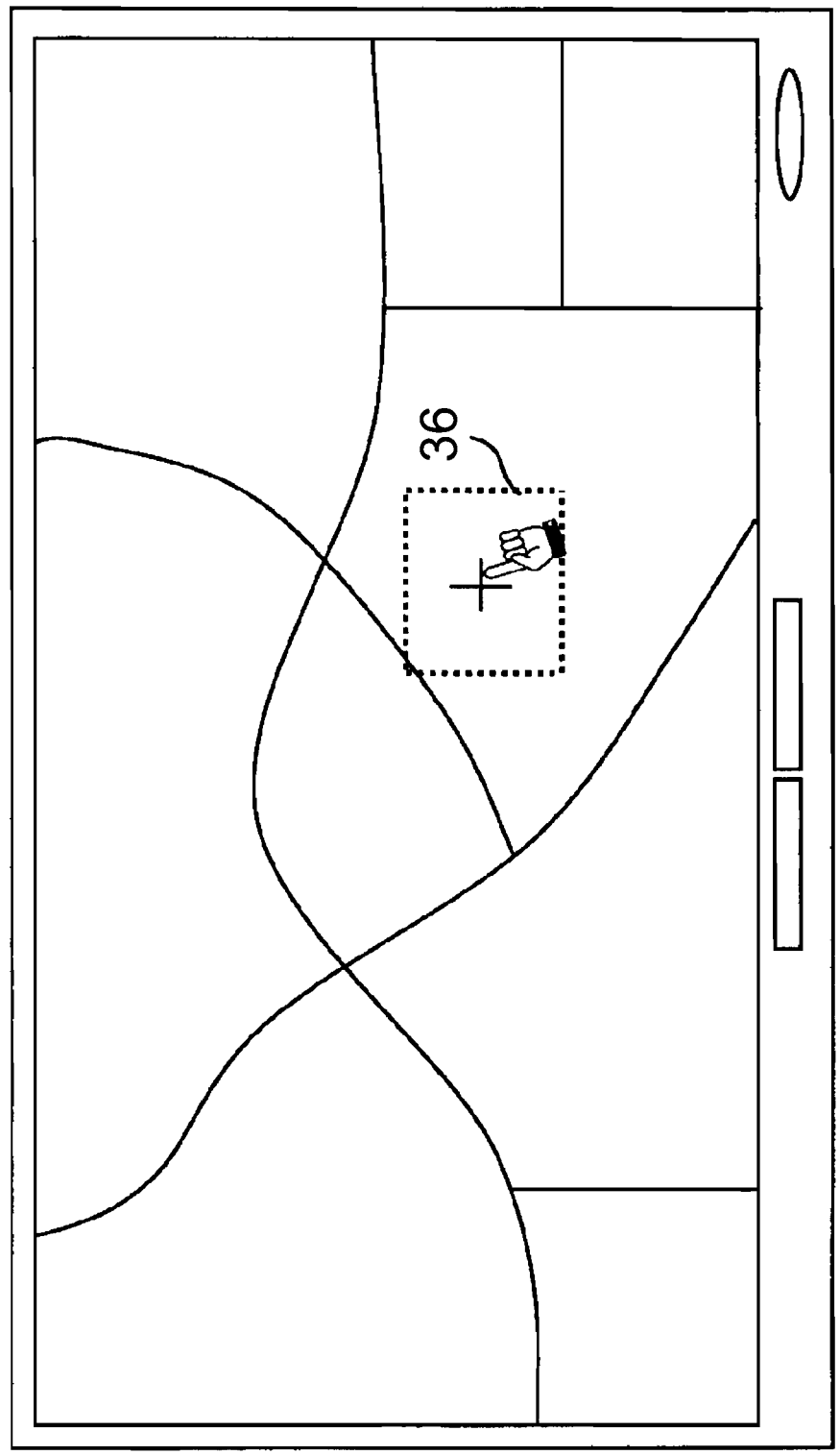
FIG. 7 A diagram to show, as another example, how a location setting mark is displayed.

Furthermore, the location setting mark may be displayed as shown in FIG. 7. In FIG. 7, the location setting mark 36 is displayed in the form of a mark (of a finger shape) similar to the location setting mark 36 shown in FIG. 3, which is enclosed within a frame. When this form is adopted, even if a portion defining the finger shape is not touched properly, with a mere touch on any portion inside the frame, it can be judged that the location setting mark has just been operated.

It is not necessarily required that a display position of the menu image 38 be determined by the processing shown in FIG. 4, as long as, based on the size of the menu image 38, the menu image 38 can be displayed in a portion of the display region of the display screen, which does not include a position at which the location setting mark 36 is displayed. For example, a positional relationship between these two images in the display region is judged relatively, and based on the result thereof, a display position of the menu image 38 is determined so that both of these images can be displayed within the display region.

In the embodiment described so far, the display screen is divided beforehand into four quadrants with respect to the center of the screen. The present invention, however, is not necessarily limited to the above-described embodiment in which the display screen is divided with respect to a fixed position. For example, a display screen is divided into four regions by a vertical division line and a horizontal division line intersecting orthogonally at a display position of the location setting mark. Generally speaking, four regions obtained by the above-described division vary in area, and therefore, in consideration of the areas of the four individual regions obtained by dividing the display screen, for example, a region having the largest area among those regions may be determined as a region including a display position of the menu image.

Furthermore, in the foregoing embodiment, the display screen is divided into four rectangular regions by straight lines respectively extending vertically and horizontally with respect to the display screen. Regions obtained by segmenting a screen, however, are not limited to rectangular regions. For example, a screen may be segmented by a plurality of radially intersecting straight lines. In this case, the segmentation is achieved annularly, making it possible that, in consideration of a distance from the center of division to a display position of the location setting mark, a display position of the menu image is disposed radially around the center of division, thereby further improving visibility.

The description is directed next to an operation procedure for location setting performed in the navigation device 1 described in the embodiment of the present invention.

Figure 8:
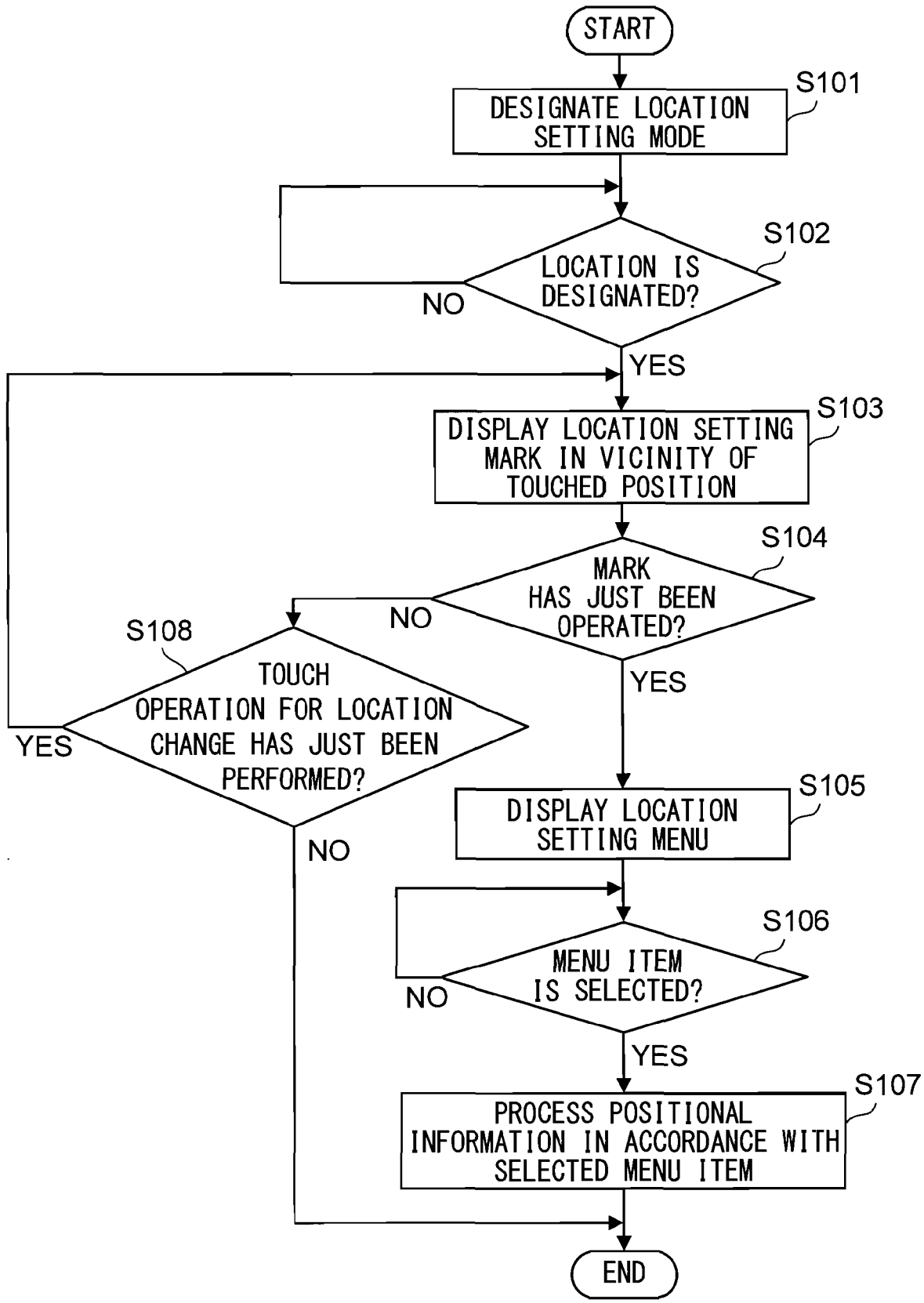
FIG. 8 A flow chart to show an operation procedure for location setting performed in the navigation device according to the embodiment of the present invention.

FIG. 8 is a flow chart to show an operation procedure for location setting performed in the navigation device 1.

In designating a desired position (location) on a map image displayed on the display unit 14 and thus setting a destination point or an intermediate point, the user selects a location input mode by means of the input unit 13 (step S101) and has a map image including the location desired to be set displayed. In order to have the map image including the desired location displayed, the user scrolls the map by moving a cursor with a finger touch on the touch panel or by using a joystick provided in a remote control.

At step S102, if the location is designated, the location position detection unit 16 identifies the location thus designated, and the display control unit 19 displays a cursor at a position on a map image corresponding to the location identified by the location position detection unit 16, after which an advance is made to step S103. At step S103, based on the position of the cursor identified by the location position detection unit 16 and displayed by the display control unit 19, the mark display unit 18 included in the display control unit 19 displays, in the vicinity of the cursor, the location setting mark 36 (see FIG. 3) indicating that the position shown by the cursor is to be set.

Next, an advance is made to step S104, where it is judged whether or not the location setting mark 36 thus displayed has just been touched. If the location setting mark 36 has just been touched, it follows that the position pointed at by the location setting mark 36, i.e. the cursor position has been designated as a location to be set. An advance thus is made to step S105, where based on a display position of the location mark 36, the menu display position determination unit 17 determines a display position of the menu image, and the display control unit 19 displays the location setting menu image 38 (see FIG. 3) at the position thus determined.

At step S106, it is judged whether or not any of the menu items of the menu image 38 thus displayed has just been operated. If no such operation has been performed, the processing at step S106 is performed repeatedly, and if it is judged that any of the items has just been operated selectively, an advance is made to step S107, where, in accordance with the selected item for location setting, the position pointed at by the location setting mark 36 is set, thus completing the processing. As described earlier, a location on a map image is identified by selecting from road data, a location on the touch panel, which is designated by the user by designating a desired location on the map image displayed on the display unit 14 through an operation on the touch panel.

Meanwhile, if, at step S104, it is not judged that the location setting mark 36 has just been touched, it follows that the position pointed at by the location setting mark 36 is not a position desired by the user to be set. In this case, an advance is made to step S108, where it is judged whether or not a touch operation for location change has just been performed. An operation for location change is performed by adjusting a desired location on a displayed map image with a finger or by moving the cursor.

If, at step S108, a touch operation for location change is detected, a return is made to step S103, where the location setting mark 36 is displayed in the vicinity of a location newly designated as a result of the location change, and the processing at step S104 and the steps subsequent thereto is performed repeatedly. If no more touch operation for location change is detected, the location setting processing is completed.

As discussed in the foregoing description, according to the present invention, the location setting mark 36 is displayed at a position desired to be set, and the location setting menu image 38 is displayed in a pop-up dialogue box emerging from the location setting mark, and thus visibility in terms of a positional relationship is improved, thereby providing excellent usability and enhancing operability in performing location setting.

INDUSTRIAL APPLICABILITY

The navigation device of the present invention is industrially useful in that, in designating a desired location on a map displayed on a display unit and thus performing location setting, a location setting menu image is displayed in the vicinity of the location thus designated, thereby improving visibility in terms of a positional relationship and thus enhancing operability.

LIST OF REFERENCE SYMBOLS

1: Navigation device
10: Control unit
11: Current position detection unit
12: Map storage unit
13: Input unit
14: Display unit
15: Route search unit
16: Location position detection unit
17: Menu display position determination unit
18: Mark display unit
19: Display control unit

The invention claimed is:

1. A navigation device comprising:
an input unit which designates a location on a map displayed on a display unit;
a location position detection unit which identifies the location designated by the input unit;
a menu display position determination unit which determines a display position of a menu image used to select an item for setting the location identified by the location position detection unit; and
a mark display unit which displays a location setting mark pointing at the designated location,
wherein the menu display position determination unit detects a display position of the location setting mark and determines the display position of the menu image in accordance with the display position of the location setting mark.

2. The navigation device according to claim 1, wherein the menu image is displayed in a pop-up dialogue box emerging from the location setting mark.

3. The navigation device according to claim 2, wherein
a display screen of the display unit has a display region segmented into a predetermined number of regions, and
the menu display position determination unit detects one of the regions, in which the location setting mark is displayed, and determines to dispose the menu image in proximity to the location setting mark, on a side of another of the regions, which is opposed to and is in a vertical or horizontal direction with respect to the detected one of the regions.

4. The navigation device according to claim 2, wherein
the menu display position determination unit detects the display position of the location setting mark, and
dividing a display screen by a plurality of straight lines intersecting at the detected display position of the location setting mark, the menu display position determination unit determines the display position of the menu image in consideration of areas of individual regions obtained by dividing the display screen.

5. The navigation device according to claim 1, wherein
a display screen of the display unit has a display region segmented into a predetermined number of regions, and
the menu display position determination unit detects one of the regions, in which the location setting mark is displayed, and determines to dispose the menu image in proximity to the location setting mark, on a side of another of the regions, which is opposed to and is in a vertical or horizontal direction with respect to the detected one of the regions.

6. The navigation device according to claim 1, wherein
the menu display position determination unit detects the display position of the location setting mark, and
dividing a display screen by a plurality of straight lines intersecting at the detected display position of the location setting mark, the menu display position determination unit determines the display position of the menu image in consideration of areas of individual regions obtained by dividing the display screen.

7. The navigation device according to claim 6, wherein the menu display position determination unit determines a region having the largest area, among the individual regions obtained by dividing the display screen, as a region including the display position of the menu image.

* * * * *